US010995799B2

(12) United States Patent
Douglas et al.

(10) Patent No.: US 10,995,799 B2
(45) Date of Patent: May 4, 2021

(54) SELF-RETAINING PULLEY FOR STEERING ASSEMBLY

(71) Applicant: STEERING SOLUTIONS IP HOLDING CORPORATION, Saginaw, MI (US)

(72) Inventors: Kevin P. Douglas, Bay City, MI (US); Dale P. Wawrzyniec, Midland, MI (US); Conrad G. Vorwerck, Bay City, MI (US); Gabriel J. McCoy, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 146 days.

(21) Appl. No.: 16/372,521

(22) Filed: Apr. 2, 2019

(65) Prior Publication Data

US 2020/0318689 A1 Oct. 8, 2020

(51) Int. Cl.
*F16D 1/116* (2006.01)
*F16H 25/22* (2006.01)
*B62D 5/04* (2006.01)
*F16H 55/36* (2006.01)
*F16H 25/20* (2006.01)

(52) U.S. Cl.
CPC .......... *F16D 1/116* (2013.01); *B62D 5/0403* (2013.01); *B62D 5/0424* (2013.01); *B62D 5/0448* (2013.01); *F16H 25/2204* (2013.01); *F16H 55/36* (2013.01); *F16H 2025/2081* (2013.01); *F16H 2025/2096* (2013.01)

(58) Field of Classification Search
CPC ...... F16D 1/116; F16H 25/2204; F16H 55/36; F16H 2025/2081; F16H 2025/2096; B62D 5/0403; B62D 5/0448; B62D 5/0424
See application file for complete search history.

(56) References Cited

U.S. PATENT DOCUMENTS

| | | | | |
|---|---|---|---|---|
| 2018/0043927 A1* | 2/2018 | Asakura | ............... | B62D 5/0424 |
| 2018/0281843 A1* | 10/2018 | Asakura | ................. | B62D 3/126 |
| 2018/0297628 A1* | 10/2018 | Bando | .................... | B62D 3/123 |
| 2018/0346015 A1* | 12/2018 | Tomikawa | ............ | F16H 55/171 |
| 2018/0354548 A1* | 12/2018 | Eickholt | ................. | F16H 55/36 |

* cited by examiner

*Primary Examiner* — Darlene P Condra
(74) *Attorney, Agent, or Firm* — Dickinson Wright PLLC

(57) ABSTRACT

A steering system is provided. The steering system may include a drive pulley and a ball nut assembly. The drive pulley may be operatively connected to a drive shaft. The ball nut assembly may be driven by the drive pulley via a belt disposed about the drive pulley and the ball nut assembly. The ball nut assembly may include a ball nut and a driven pulley. The ball nut may have an inner surface disposed about a ball screw that defines and extends along a first axis and an outer surface disposed opposite the inner surface. The ball nut may define a first groove that extends from the outer surface towards the inner surface. The driven pulley may be disposed about the ball nut and have a retaining member that includes a finger for extending into the first groove to engage the ball nut and driven pulley without separate fasteners.

10 Claims, 3 Drawing Sheets

SELF-RETAINING PULLEY FOR STEERING ASSEMBLY

BACKGROUND

Steering assemblies are generally provided with a subsystem that transmits torque from a motor to a rotating member that is disposed about a rack or a translatable member. A pulley may be attached to the rotating member and the torque is driven through the pulley to the rotating member. Traditionally, the pulley is attached to the rotating member by fasteners that extend through the pulley and into the rotating member. The fasteners may hold the pulley in a fixed position relative to the rotating member to inhibit movement of the pulley. The fasteners may increase axial load capabilities of the pulley and the rotating member.

SUMMARY

According to an embodiment, a steering system is provided. The steering system includes a drive pulley and a ball nut assembly. The drive pulley is operatively connected to a drive shaft. The ball nut assembly is driven by the drive pulley via a belt disposed about the drive pulley and the ball nut assembly. The ball nut assembly includes a ball nut and a driven pulley. The ball nut has an inner surface disposed about a ball screw that defines and extends along a first axis and an outer surface disposed opposite the inner surface. The ball nut defines a first groove that extends from the outer surface towards the inner surface. The driven pulley is disposed about the ball nut and has a retaining member that includes a finger for extending into the first groove to engage the ball nut and driven pulley to one another without separate fasteners.

According to another embodiment, an actuation system for a ball nut assembly for a steering system is provided. The ball nut assembly includes a ball nut and a driven pulley. The ball nut has a first inner surface and a first outer surface disposed opposite the first inner surface. Each of the first inner surface and the first outer surface extends between a first rim and a second rim and defines a surface axis oriented substantially parallel to a central axis defined by a rack. The ball nut defines a first groove that extends from the first outer surface towards the first inner surface. The driven pulley has a second inner surface and a second outer surface disposed opposite the second inner surface. Each of the second inner surface and the second outer surface extends between a first end and a second end of the driven pulley along a driven pulley axis oriented substantially parallel to the central axis. The driven pulley defines a retaining member having an engagement member and a finger extending from the engagement member. The finger is sized for extending into the first groove.

According to yet another embodiment, an actuation system for a ball nut assembly is provided. The ball nut assembly includes a driven pulley having an inner surface and an outer surface disposed opposite the inner surface. Each of the inner surface and the outer surface extend between a first end of the driven pulley and a second end of the driven pulley along a first axis defined substantially parallel to a central axis defined by a ball screw for operatively connecting to the driven pulley. The driven pulley defines a retaining member having an extension that extends from the inner surface along a second axis that is oriented substantially transverse to the first axis. The retaining member has an engagement member that extends towards the second end along a third axis oriented substantially parallel to the first axis and a finger extending from a face of the extension towards the first end of the driven pulley.

These and other advantages and features will become more apparent from the following description taken in conjunction with the drawings.

BRIEF DESCRIPTION OF THE DRAWINGS

The subject matter of this disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Referring now to the Figures, where the present disclosure will be described with reference to specific embodiments, without limiting the same, it is to be understood that the disclosed embodiments are merely illustrative and that various and alternative forms may be available. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
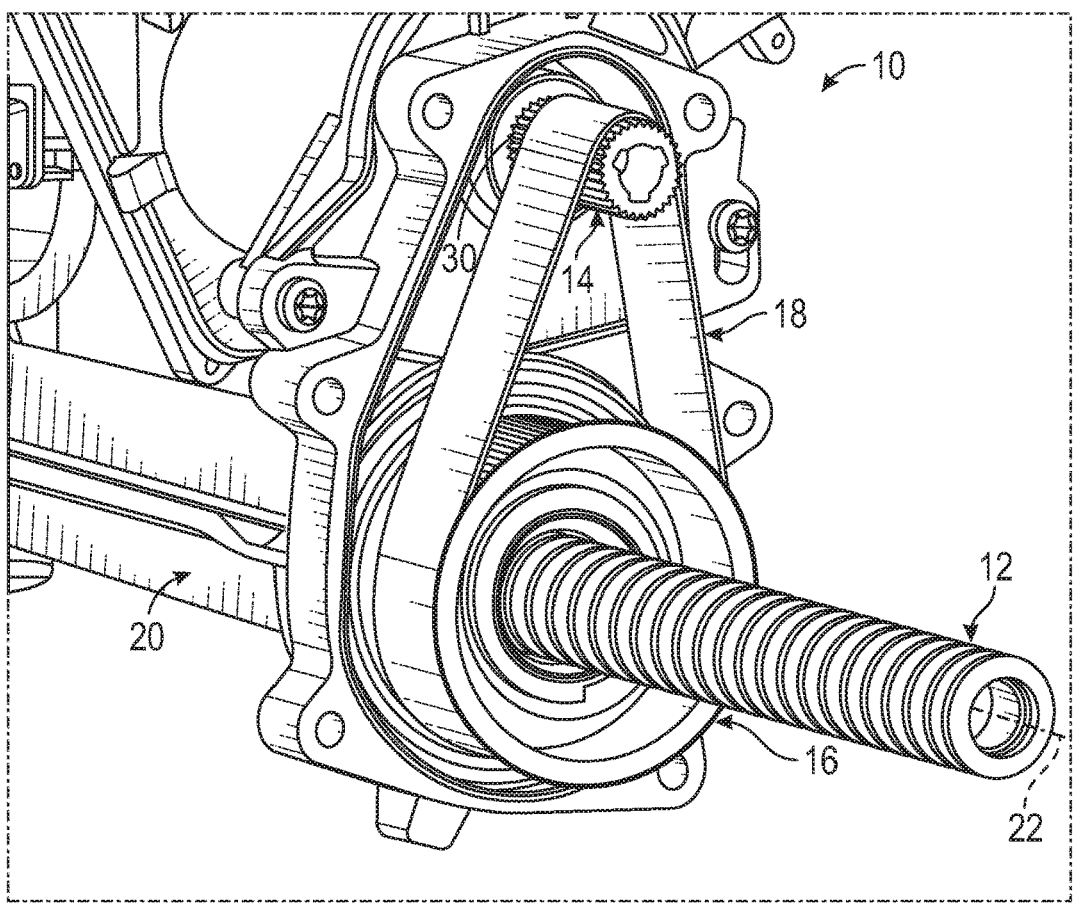
FIG. 1 is a perspective view of an example of a portion of a steering system.

FIG. 1 illustrates an example of a portion of a steering system for a vehicle, referred to generally as a steering system 10 herein. The steering system 10 may also be referred to as an actuation system for a ball nut assembly. The steering system 10 may assist in facilitating steering or directional control of the vehicle through connection to wheels of the vehicle. The steering system 10 may include a ball screw or a rack 12, a drive pulley 14, a ball nut assembly 16, and a belt 18. The belt 18 may extend about the drive pulley 14 and the ball nut assembly 16 to transfer rotation therebetween.

The rack 12 extends through a housing assembly 20. The housing assembly 20 may house a motor such as an electric motor (not shown). The rack 12 may define a first axis 22. The rack 12 may be arranged to translate along and/or rotate about the first axis 22 to assist in rotation of a vehicle steering wheel operatively connected to the steering system 10 and/or to assist in steering of the vehicle.

The drive pulley 14 is in operative communication with a shaft 30 that extends from the electric motor disposed within the housing assembly 20. The shaft 30 may also be referred to as a drive shaft. A central axis of the drive pulley 14 may be oriented generally parallel to the first axis 22. The ball nut assembly 16 may be disposed about and operatively connected to the rack 12. The belt 18 may be wrapped around a portion of the drive pulley 14 and a portion of the ball nut assembly 16. Rotation of the drive pulley 14, by actuation of the electric motor, may drive rotation of the ball nut assembly 16 via the belt 18.

Figure 2:
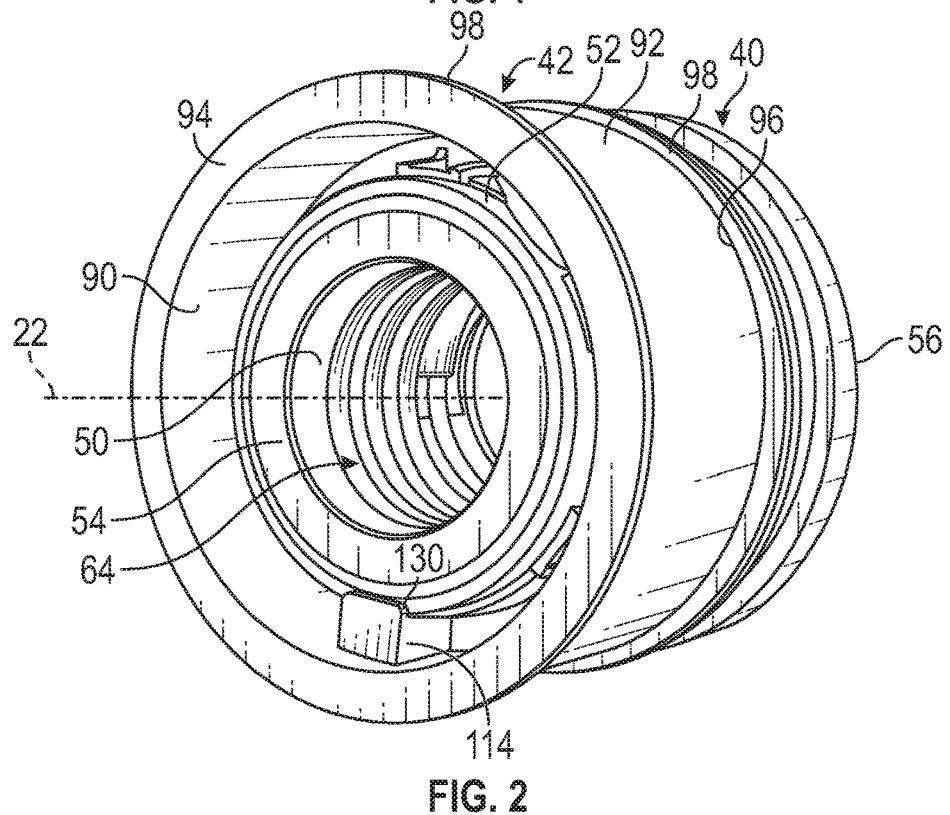
FIG. 2 is a perspective view of an example of a ball nut assembly of the steering assembly of FIG. 1.

FIGS. 2 through 6 illustrate further details of a portion of the steering system 10. The ball nut assembly 16 may include a ball nut 40 and a driven pulley 42 that may operate with one another to transfer torque from the belt 18 to the rack 12. In FIG. 2, the ball nut 40 and the driven pulley 42 are shown mounted to one another. The driven pulley 42 may be arranged as a self-retaining pulley that is connected to the ball nut 40 without mechanical fasteners or snap rings but is retained onto the ball nut 40 using integral or integrated retention features.

Figure 3:
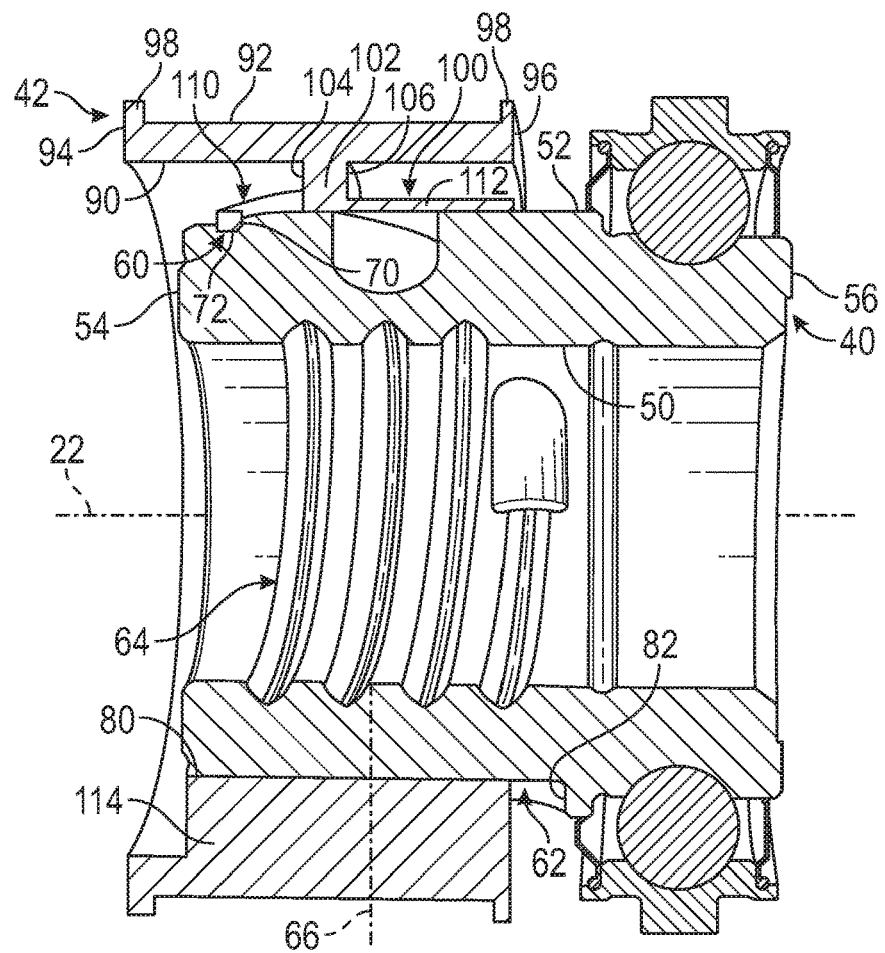
FIG. 3 is a side view, in cross-section, of a portion of the ball nut assembly of FIG. 2.
Figure 4:
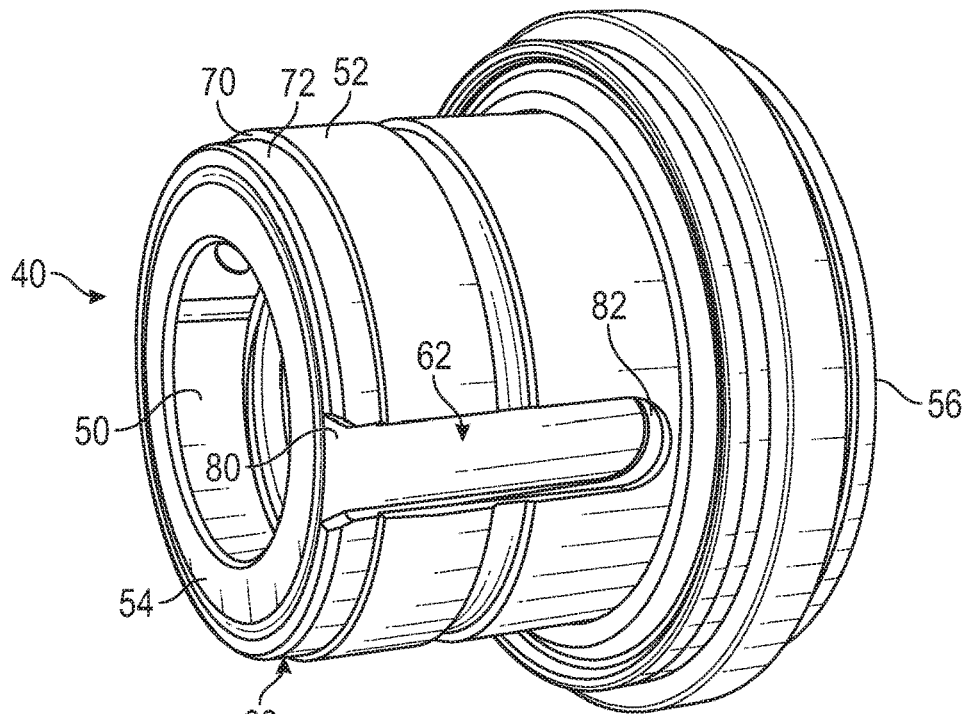
FIG. 4 is a perspective view of an example of a ball nut of the ball nut assembly of FIG. 2.

Now referring to FIGS. 2-4, the ball nut 40 may be arranged within the steering system 10 as a rotating component that may assist in transferring a torque or force to the rack 12 to facilitate rotation and/or translation of the rack 12 relative to the first axis 22. The ball nut 40 may be mounted about the rack 12 and include an inner surface 50, an outer surface 52, a first rim 54, and a second rim 56. The ball nut 40 may be arranged with the rack 12 such that the inner surface 50 is disposed about the rack 12.

The ball nut 40 may define a first groove 60, a second groove 62, and a third groove 64. The first groove 60 may also be referred to as a retainer groove, the second groove 62 may also be referred to as an anti-rotation groove, and the third groove 64 may also be referred to as a guide groove. The first groove 60 may extend about a perimeter of the ball nut 40 and may be located proximate the first rim 54. The second groove 62 may extend from the outer surface 52 towards the inner surface 50 and define a shape similar to a channel cutout. The third groove 64 (best shown in FIG. 3) may be defined in a spiral pattern about a portion of the inner surface 50. For example, a shape of the third groove 64 may correspond to a shape of threads of the rack 12 such that the third groove 64 may receive the threads. At least a portion of the third groove 64 may extend from the inner surface 50 in a direction substantially parallel with a second axis 66.

The ball nut 40 may also define a first engagement surface 70 and a second engagement surface 72. The first engagement surface 70 may extend between the outer surface 52 and the second engagement surface 72. In one example, the first engagement surface 70 may define a plane oriented substantially perpendicular to another plane defined by the second engagement surface 72. The second engagement surface 72 may extend between the first engagement surface 70 and the first rim 54. The first groove 60 has a first axial width or length that is measured between the first engagement surface 70 and the first rim 54.

The second groove 62 may be located between the first rim 54 and the second rim 56. The second groove 62 may be an elongated axial groove defined in an orientation substantially transverse to the first groove 60. The second groove 62 may include a first end 80 and a second end 82. The first end 80 may also be referred to as an open end and the second end 82 may also be referred to as a closed end. The first end 80 of the second groove 62 may be located adjacent the first rim 54 and the second end 82 of the second groove 62 may be located adjacent the second rim 56. The second groove 62 has a second axial width or length that is measured between the first end 80 and the second end 82. The second axial length may define a length that is greater than the first axial width or length of the first groove 60.

The third groove 64 may extend from the inner surface 50 of the ball nut 40 towards the outer surface 52 of the ball nut 40. As mentioned above, the third groove 64 may be sized to receive at least one of a ball member (not shown) or a ball guide (not shown). The ball member or the ball guide may be received between threads or teeth of the rack 12. The third groove 64 may assist in facilitating a driving of the rack 12 by the ball nut 40 responsive to rotation of the ball nut assembly 16 about the first axis 22.

Referring to FIG. 2, the driven pulley 42 is disposed about and is connected to the ball nut 40. The driven pulley 42 is arranged as a self-retaining pulley that is operatively connected to the ball nut 40 without fasteners or snap rings but is retained onto the ball nut 40 using integral or integrated retention features further described herein.

Figure 6:
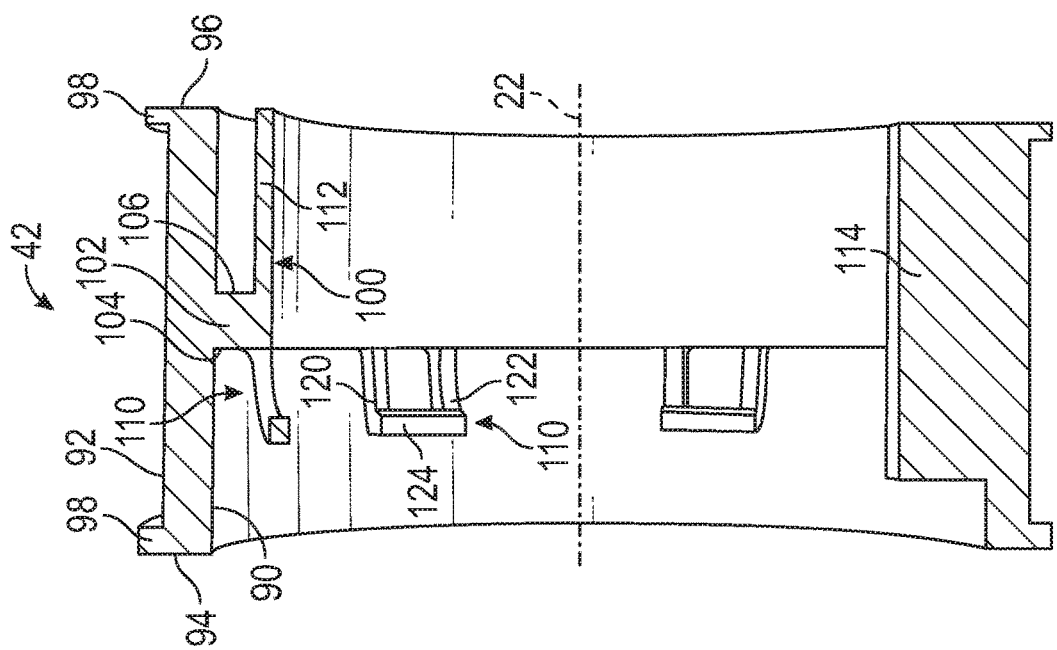
FIG. 6 is a side view, in cross-section, of a portion of the driven pulley of FIG. 5.
Figure 5:
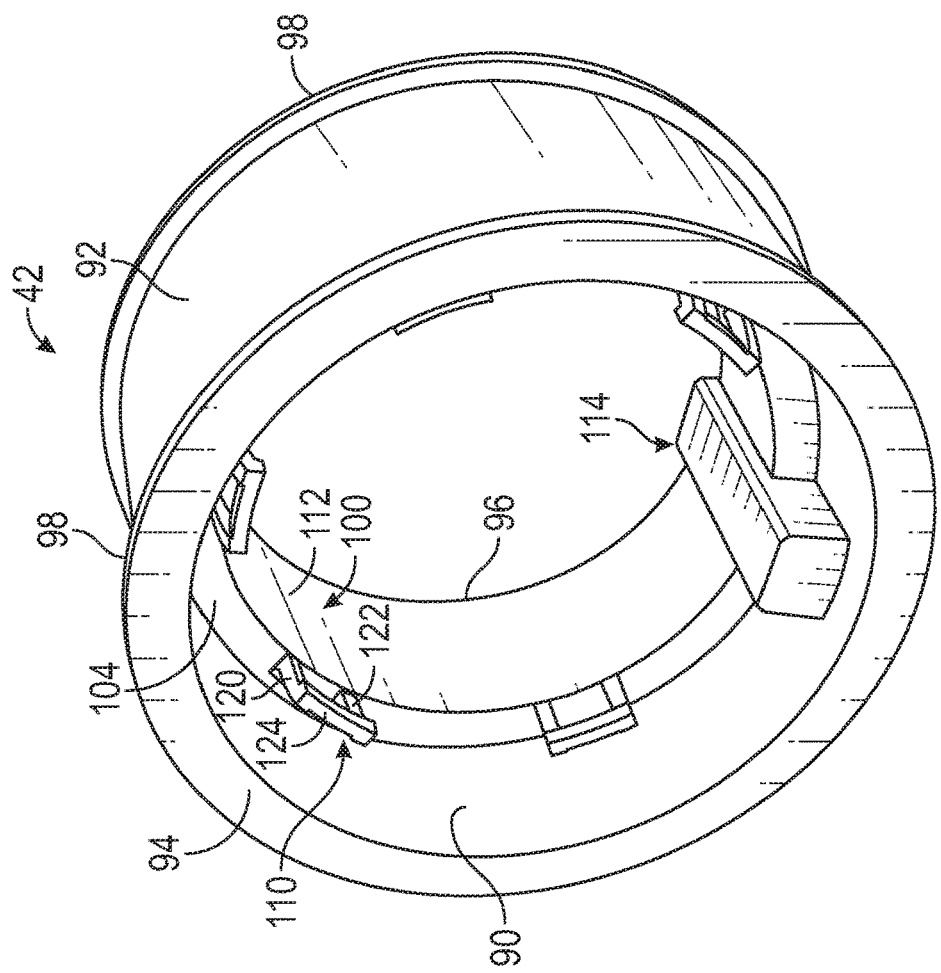
FIG. 5 is a perspective view of an example of a driven pulley of the ball nut assembly of FIG. 2.

Referring now additionally to FIGS. 3, 5, and 6, the driven pulley 42 may include an inner surface 90, an outer surface 92, a first end 94, and a second end 96. The inner surface 90 may be disposed about and spaced apart from the outer surface 52 of the ball nut 40. Belt 18 may engage the outer surface 92 and may be retained between a pair of lips or flanges 98 that each extends away from the outer surface 92. The inner surface 90 and the outer surface 92 may each extend between the first end 94 and the second end 96 in an orientation parallel to the first axis 22.

The driven pulley 42 may define a retaining member 100 that extends from an extension 102 towards the first axis 22. As shown in FIGS. 3 and 6, the extension 102 includes a first face 104 and a second face 106 that is disposed opposite the first face 104. The first face 104 and the second face 106 each extend towards the first axis 22.

The retaining member 100 may include a finger 110 or a plurality of fingers 110, an engagement member 112, and a retaining block 114. The finger 110 (or each of the plurality of fingers 110) may extend from the engagement member 112 or from the first face 104 of the extension 102 towards the first end 94 for engagement with the first groove 60. The finger 110 may be arranged as a snap-fit finger that engages the first engagement surface 70 and/or the second engagement surface 72 of the first groove 60 to limit axial movement of the driven pulley 42 relative to the first axis 22.

Referring now to FIG. 5, the finger 110 includes a first finger member 120, a second finger member 122, and a third finger member 124. The first finger member 120 and the second finger member 122 each extend from the first face 104 or the engagement member 112 towards the first end 94. The first finger member 120 is oriented parallel to and is spaced apart from the second finger member 122. The third finger member 124 extends between distal ends of the first finger member 120 and the second finger member 122 and defines a surface plane oriented generally parallel to the first face 104 of the extension 102. The third finger member 124 may be sized to extend into the first groove 60 for engagement with the first engagement surface 70.

Referring again to FIGS. 3 and 6, the engagement member 112 may extend from the second face 106 towards the second end 96. The engagement member 112 may define a surface oriented substantially parallel to the first axis 22 to assist in facilitating engagement between the ball nut 40 and the driven pulley 42. The engagement member 112 may be a generally continuous surface that may be interrupted by the retaining block 114.

Now referring again to FIGS. 2, 5, and 6, the retaining block 114 may extend from the inner surface 90 of the driven pulley 42. The retaining block 114 may be spaced apart from the finger 110. The retaining block 114 may extend through at least a portion of the retaining member 100. The retaining block 114 may be sized to extend into the second groove 62 of the ball nut 40 to inhibit circumferential motion of the driven pulley 42 relative to the ball nut 40 about the first axis 22. The retaining block 114 may be arranged to assist in transferring torque or a load from the belt 18 through the driven pulley 42 to the ball nut 40.

Referring now again to FIG. 2, the retaining block 114 may include a lip or a flange 130. The lip or flange 130 may be located upon the retaining block 114 to engage the ball nut 40 at a location proximate the first rim 54 to assist in facilitating axial retention of the driven pulley 42 relative to the ball nut 40.

The finger 110 may eliminate the use of separate fasteners or snap rings to retain the driven pulley 42 to the ball nut 40. The finger 110 may be structured to slide over the second engagement surface 72 and engage the first engagement surface 70. The retaining block 114 may be structured to slide through the first end 80 (e.g. the open end) of the second groove 62 towards the second end 82 (e.g. the closed end) of the second groove 62 to enable the driven pulley 42 to be press fit onto the ball nut 40. An arrangement of the driven pulley 42 may also simplify an assembly process of the ball nut assembly 16 as well as simplify an installation of the driven pulley 42 onto the ball nut 40.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. A steering system, comprising:
a drive pulley operatively connected to a drive shaft; and
a ball nut assembly driven by the drive pulley via a belt disposed about the drive pulley and the ball nut assembly, the ball nut assembly comprising:
a ball nut having an inner surface disposed about a ball screw that defines and extends along a first axis and an outer surface disposed opposite the inner surface, the ball nut defining a first groove that extends from the outer surface towards the inner surface, and
a driven pulley disposed about the ball nut, the driven pulley having a retaining member that includes a finger for extending into the first groove to engage the ball nut and driven pulley to one another without separate fasteners, wherein the driven pulley defines a pulley inner surface and a pulley outer surface, each pulley surface extending between a first driven pulley end and a second driven pulley end in a direction substantially parallel to the first axis, wherein the retaining member further includes an engagement member disposed opposite the finger, wherein the engagement member defines an engagement member axis oriented parallel to the first axis and extending towards the second driven pulley end.

2. The system of claim 1, wherein the ball nut and the driven pulley are arranged with one another such that the first groove is disposed about the ball nut.

3. The system of claim 1, wherein the retaining member extends from the inner surface towards the outer surface.

4. The system of claim 1, wherein the ball nut further defines a second groove and a third groove, the second groove extending from the outer surface towards the inner surface and shaped as a channel cutout, the third groove defining a spiral shape about a portion of the inner surface.

5. An actuation system for a ball nut assembly comprising:
a driven pulley having an inner surface and an outer surface disposed opposite the inner surface, each of the inner surface and the outer surface extending between a first end of the driven pulley and a second end of the driven pulley along a first axis defined substantially parallel to a central axis defined by a ball screw for operatively connecting to the driven pulley, the driven pulley defining a retaining member having an extension that extends from the inner surface along a second axis that is oriented substantially transverse to the first axis, the retaining member having an engagement member that extends towards the second end along a third axis oriented substantially parallel to the first axis and a finger extending from a face of the extension towards the first end of the driven pulley.

6. The system of claim 5, wherein the finger includes a first finger member extending from the face along a finger axis oriented parallel to the central axis, a second finger member spaced apart from the first finger member and extending from the face, and a third finger member extending between distal ends of the first finger member and the second finger member.

7. The system of claim 6, wherein the third finger member defines a plane oriented parallel to the face of the extension.

8. The system of claim 5, wherein the driven pulley defines a retaining block that extends from the inner surface.

9. The system of claim 5, wherein the engagement member is a flange located proximate a ball nut end for securing a ball nut to the driven pulley to facilitate axial retention of the driven pulley relative to the ball nut.

10. The system of claim 5, wherein the retaining member is a retaining block sized for inserting within an anti-rotation groove defined by a ball nut to secure the driven pulley and the ball nut to one another such that the driven pulley and the ball nut rotate simultaneously.

* * * * *